Patented May 4, 1937

2,079,512

UNITED STATES PATENT OFFICE 2,079,512

REMEDY FOR REGULATING THE DEGREE OF ACIDITY OF THE GASTRIC JUICE

Franz Körösy, Budapest, Hungary

Application March 31, 1934, Serial No. 718,464
In Hungary April 29, 1933

4 Claims. (Cl. 167—55)

The stomach only functions correctly when the degree of acidity of the contents of the stomach exceeds the minimum value (pH=4) necessary for the action of the pepsin, but does not attain the concentration (pH=1.5) at which the stomach is attacked. For regulating the acid content of the stomach, in the case of superacidity, hitherto either the secretion of acid itself was paralyzed by small doses of strong poisons (for example, atropin) or the acid which is already secreted was neutralized, for example by comparatively strong alkaline substances (sodium bicarbonate, magnesia, magnesium carbonate or calcium carbonate), or was partly combined by means of more weakly acting compounds containing alumina and silica.

The strongly alkaline remedies, it is true, produce in most cases a momentary alleviation, but the stomach, having become alkaline, cannot digest without acid, and reacts with an increased secretion of acid, so that continued use of such remedies results in an increase in the superacidity of the stomach.

Figure 1:
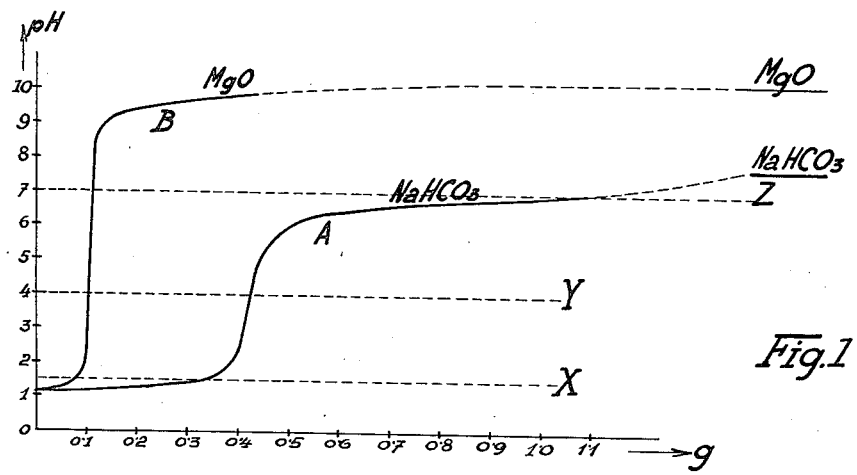

The diagram in Figure 1 shows the variation of the pH in 50 cubic centimetres of a 0.1 normal hydrochloric acid solution caused by the addition of sodium bicarbonate or magnesia. The ordinates represent the pH values. pH=7 corresponds to the neutral solution, so that the alkaline region lies above the line Z, while the acid region lies below the said line. The lines X and Y represent the permissible lowest limit (1.5) and highest limit (4.0), respectively, of the pH of the gastric juice. The pH of the contents of the stomach must therefore lie in the region between the lines X and Y. The lines A and B show the variations of the pH value caused by an addition of sodium bicarbonate and magnesia, respectively. The curves show that, with 0.08 gram of magnesia, the pH value has not yet reached the line X, whereas a minimum increase of the magnesia, that is only to 0.1–0.12 gram, results in the upper limit Y of the normal acidity being exceeded, the solution becoming thereby neutral and even alkaline. Conditions with sodium bicarbonate are somewhat more favourable, because the acidity decreases at the commencement somewhat more slowly than with magnesia, and the region of normal acidity is only attained with 0.3 gram. In this case also, however, even quite a small increase of the addition effects a sudden increase in the pH value, so that even 0.43 gram is sufficient to cause the region of normal acidity to be exceeded. Thus, even quite small excess amounts of such alkalizing remedies lower the acidity below the permissible lowest limit, because of course the excess amounts tend to cause the pH value to approach the actual pH value of the magnesia or sodium bicarbonate solution, which value is above 7.5 for sodium bicarbonate and even above 10 for magnesia. It is therefore clear that, even with accurately measured quantities of such alkalizing remedies, the degree of acidity of the contents of the stomach can only be adjusted to the normal value if the quantity of the contents of the stomach, and their degree of acidity are previously accurately ascertained at the moment of taking the remedy. Even this is not sufficient, because for example in nervous ailments of the stomach, superacidity alternates with inacidity within comparatively short periods, while the symptoms in both cases bear a considerable resemblance to each other, for which reason the sick person always takes the same medicine for them, even if the acid condition of the stomach has altered in the meantime. Such a wrong treatment may of course have serious consequences. This latter disadvantage is also not eliminated by the weakly alkaline remedies containing aluminium silicate which have been proposed in place of the strongly alkaline remedies, but which also possess the disadvantage that, although they are less sensitive in regard to the amounts taken they require exceptionally large doses, attaining 10 grams, for providing the normal acidity. Of course, all these remedies, being alkaline (pH about 8) may also lower the the degree of acidity of the gastric juice below the permissible limit.

In contradistinction thereto, this invention relates to the manufacture of a remedy which in all circumstances adjusts the degree of acidity of the stomach contents, both in the case of a superacid and an in-acid stomach, independently of the initial value of the said degree of acidity and of any excess amount of the remedy.

The essential feature of the invention resides in the fact that a buffer mixture is made from compounds having a salt character with compounds of acid reaction, the pH value of the said buffer mixture, both in concentrated solution, and also in the maximum dilution occurring in the stomach, lying within the region of the normal acidity of the gastric juice, that is to say, within the values of 1.5 and 4. Since the pH value of the buffer mixture is to a relatively high degree independent both of the degree of dilution and the quantity of the acid entering into the solution, that is to say, it remains within the limits of the normal acidity of the stomach, a buffer mixture corresponding to the foregoing conditions will adjust the degree of acidity of the stomach contents to the normal acidity.

Any acid or acid mixture, which is physiologically non-poisonous and which has its dissociation constant lying between $10^{-1.5}$ and $10^{-4}$, may be employed as acid component for the buffer mixture according to the invention, while the other component of the buffer mixture may be either a salt of this acid or another salt. Acid salts may be employed instead of acids or salts.

The salts obtained by the substitution of a greater or lesser number of hydrogen ions of polyvalent acids by bases may form both the acid and the salt component of the buffer mixtures. Amphoteric electrolytes, amino acids or polypeptides may be employed as salt component of the buffer mixture. Since the molecule of these compounds contains both acid and basic groups, they behave as salts from the point of view of the pH. The salts of these compounds formed with acid, however, act already as strongly acid salts and may act in the buffer mixture as acids.

Buffer mixtures may therefore be formed advantageously as follows: orthophosphoric acid and primary phosphates; pyrophosphoric acid or primary pyrophosphates and secondary pyrophosphates, dithionic acid and primary dithionates; bisulphates and sulphates, dithiosulphates and thiosulphates; aminophosphoric acid and primary aminophosphates; citric acid and primary citrates; lactic acid, malic acid, glycolic acid, glyceric acid, fumaric acid, malonic acid, tartaric acid, ortho-acetoxy-benzoic acid, mandelic acid, adenosine-phosphoric acid, inosine acid, creatinine-phosphoric acid and the salts or primary salts of these acids; the above-mentioned amino acids and their acid salts, for example, glycocoll and its hydrochloride or sulphates, furthermore, phenylglycocoll, alanine, leucine, aspartic acid, alanylglycine, glycylglycine, leucylglycine, and their acid salts and so forth. It is remarked that it is not necessary in each case to mix the acid component with its own salt; thus for example a primary phosphate need not be mixed with the liquid phosphoric acid, but in place thereof an acid, dissociating more strongly than phosphoric acid or acid salts, for example, bisulphates, glycine hydrochlorides or betainehydrochlorides may be employed which liberate phosphoric acid after the solution of the mixture. In selecting the components of the buffer mixtures, the specific action of the anions of the components of the mixture may also be taken into consideration, if the specific action of such anions is to be effective in addition to the buffer action of the mixture.

Figure 2:
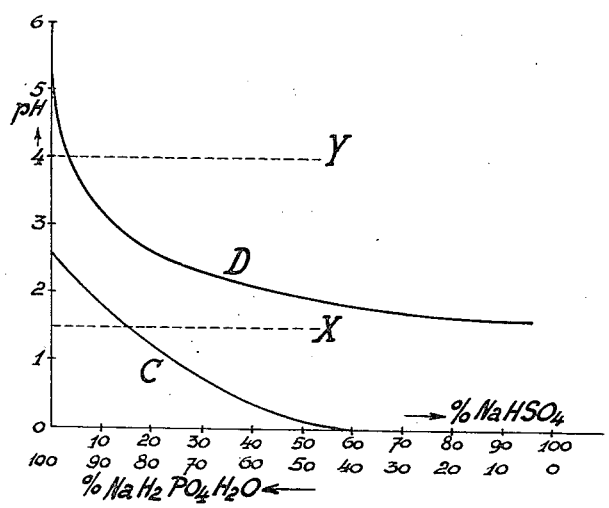

The mixing proportion of the components of the buffer mixture must be so determined that the pH value of the solution of the mixture both in the concentrated state and also in the maximum dilution attainable in the stomach falls within the region of the normal acidity of the stomach. Thus, for example, in the case of the remedy made from a solid mixture of sodium bisulphate ($NaHSO_4$) and monosodium-phosphate ($NaH_2PO_4.H_2O$), the mixing proportion may be obtained from the diagram in Figure 2. The abscissae denote the percentage proportion of the sodium bisulphate and monosodium-phosphate present in the buffer mixture, while the ordinates give the pH value of the solutions of the respective mixtures. The curve C for the concentrated solution, and the curve D for the 0.5% solution, show the connection between the mixing proportion and the pH values. The lines X and Y bound the region of permissible acidity of the stomach.

These curves show that, for regulating the acid contents of the stomach, any mixing proportion is suitable, the pH of which is within the area bounded by the lines X, Y, C, D. The 0.5% solution corresponds to the maximum dilution occurring in the stomach. The pH should not exceed 4.0, that is to say, the buffer mixture may contain not less than 3% of sodium bisulphate in accordance with the point of intersection of the lines D and Y. Since, however, it is necessary to take into consideration the fact that the remedy taken in the solid state into the stomach forms initially a concentrated solution and the pH even under these conditions should not sink below 1.5, the bisulphate content of the buffer mixture should not exceed 17% corresponding to the point of intersection of the lines C and X. The more bisulphate the buffer mixture contains, that is to say, the more its acid character is predominant, the greater are the quantities required for neutralizing a given superacidity, whereas an inacid stomach is acidified all the more readily. Within the two limits, therefore, the mixing proportions may be selected freely according as to whether the desired effect is to be obtained with greater or smaller quantities, and as to whether the desired magnitude of the final value of the pH to be attained by the remedy lies within the limits 1.5 and 4.0.

Figure 3:
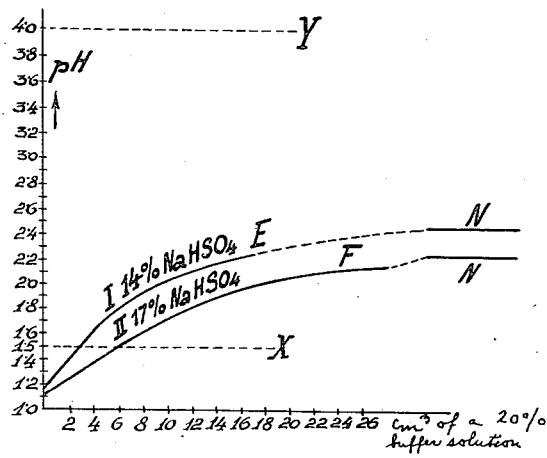

Figure 3 shows for example the effect obtained by the addition of a mixture containing 14% of bisulphate or 17% bisulphate to 50 cubic centimetres of a hydrochloric acid solution with 1.1 pH, corresponding to a strongly acid stomach content. The lines X and Y are the limits of the normal acidity of the stomach. The curves E and F correspond to the buffer mixtures with 14% sodium sulphate and 17% sodium bisulphate respectively. "Ne" and "Nf" denote the actual pH values of the 20% solutions of a buffer mixture containing 14% and 17% of sodium bisulphate, respectively. The diagrams show that on the addition of the buffer solution, the pH value at first increases uniformly, that is to say, the degree of acidity diminishes correspondingly. Above the line X, that is to say, as soon as the curves have reached the region of normal acid content, the degree of acidity no longer diminishes in proportion to the added quantity of the buffer solution, but the pH curve gradually approaches the value "Ne" or "Nf" of the pH of the buffer solution itself, that is to say, it remains within the region of normal degree of acidity.

The mixture according to the invention may be produced in the solid state or as a solution. In the latter case, it is not the pH value of the concentrated solution but that of the solution of these components to be employed which must fall within the limit of 1.5, because this latter concentration constitutes the maximum concentration occurring in the stomach.

Inert substances for improving the taste may be added to the remedy and furthermore foods or other remedies, for example pepsin may be added, since the normal acidity of the stomach as ensured by the buffer mixture assists the action of other remedies taken at the same time.

What I claim is:—

1. A remedy for restoring the normal acidity of the stomach consisting of a mixture of compounds of which one at least is selected from a group which possesses a dissociation constant relative to free hydrogen ions from $10^{-1.5}$ to $10^{-4}$, while the other one has a smaller dissociation constant and is present in such a proportion that the mixture will yield an aqueous solution which when concentrated has a pH value above 1.5 and when diluted as far as about 0.5% has a pH value below 4.

2. A remedy for restoring the normal acidity of the stomach comprising a buffer mixture having an acid component and a salt component, said acid component being selected from a group having a dissociation constant relative to free hydrogen ions from $10^{-1.5}$ to $10^{-4}$, the other component having a smaller dissociation constant and being present in such proportion that the mixture will yield an aqueous solution which when concentrated has a pH value above about 1.5 and when diluted as far as about 0.5% has a pH value below about 4.

3. A remedy for restoring the normal acidity of the stomach consisting of a dry mixture of 3 to 17% sodium bisulphate and 97 to 83% monosodium-phosphate adapted to form a buffer solution.

4. A remedy for restoring the normal acidity of the stomach, comprising a solid mixture of acid and salt components, of which at least one is selected from a group possessing a dissociation constant relative to free hydrogen ions higher than $10^{-1.5}$ and at least one other is selected from a group of compounds possessing a dissociation constant relative to free hydrogen ions lower than $10^{-1.5}$ and being mixed in a proportion so that the mixture will yield an aqueous solution which when concentrated has a pH value about 1.5 and when diluted as far as about 0.5% has a pH value below about 4.

FRANZ KÖRÖSY.